United States Patent [19]

Lalikos et al.

[11] 4,262,941
[45] Apr. 21, 1981

[54] SELF-ALIGNING TUBE FITTING

[75] Inventors: James M. Lalikos, Springfield; Kenneth E. Lefebvre, Hampden, both of Mass.

[73] Assignee: Titeflex Corporation, Springfield, Mass.

[21] Appl. No.: 73,083

[22] Filed: Sep. 6, 1979

[51] Int. Cl.³ .............................................. F16L 19/00
[52] U.S. Cl. .................................. 285/110; 285/334.4
[58] Field of Search ............ 285/110, 261, 263, 334.4, 285/332.1; 227/206 R

[56] References Cited

U.S. PATENT DOCUMENTS

| 3,672,704 | 6/1972 | Christianson | 285/110 |
| 3,891,246 | 1/1975 | Hopper | 285/110 |
| 4,025,092 | 5/1977 | Wakefield | 285/334.4 X |

FOREIGN PATENT DOCUMENTS 2640220  3/1978  Fed. Rep. of Germany ........... 285/110

Primary Examiner—Thomas F. Callaghan

[57] ABSTRACT

A gas-tight fitting which is an improvement over the lip-seal fitting shown in U.S. Pat. No. 3,672,704 (Roger D. Christianson, inventor). The fitting includes three parts which are a nut, a sleeve, and a threaded nipple. The sleeve ends in an annular flange having an arched cross section which rests upon a seat on said nipple when said nut is tightened into position. Between the flange and the sleeve proper, there is a neck which terminates at its top in a spherically arcuate section which is complementary to a similar section in the nut. Together, the spherical sections form a swivel joint to accommodate axial misalignments.

4 Claims, 7 Drawing Figures

SELF-ALIGNING TUBE FITTING

This invention relates to pressure resistant fittings for tubular structures, and more particularly—although not exclusively—to end fittings for high performance aircraft fuel, lubrication, hydraulic, and the like, line hoses. The terms "fluid line" or "fluid hose" are used hereinafter to include all of these and similar applications.

U.S. Pat. No. 3,672,704 (Roger D. Christianson, inventor) entitled "LIP-SEAL FITTING", issued June 27, 1972, shows a hose fitting having an internal flange in the form of a Belleville spring. In cross section, the flange has a toe and a heel with a spring arched therebetween. When threaded couplers associated with the flange are tightened, the arch tends to compress with the tension of the Belleville spring causing augmented pressure in two concentric sealing areas.

This patented seal is very efficient and tends to become tighter with an increase of internal hose pressure. However, some care is required when the fittings are joined, in order to insure proper axial alignment. If the mechanic installing a hose should fail to seat the arched spring flange carefully, the fitting might leak. Sometimes, the misalignment might occur as a result of causes beyond the mechanic's control, such as spring back, manufacturing tolerances, vibrations, or the like. It should be noted that the fitting is required to insure against leakage under extremely hostile environmental conditions. For example, an aircraft might encounter many "G's" at extremely high altitudes when external atmospheric pressure is greatly reduced. Then, there could be a leakage caused by misaligned fittings which could not have been detected prior to flight and which appears only after leakage occurs during use.

Accordingly, an object of the invention is to provide new and improved, flanged hose fittings which are more tolerant of misalignments. Here, an object is to provide fittings which may be used by less skilled mechanics.

Another object of the invention is to provide a safer aircraft fluid line by reducing the chances for leakage under extremely hostile conditions.

Still another object of the invention is to adapt the fitting of U.S. Pat. No. 3,672,704 to more widespread usage.

A preferred embodiment of the invention is seen in the attached drawings, wherein.

Figure 1:
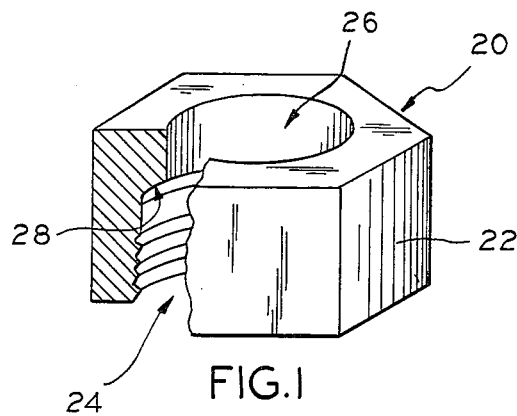
FIG. 1 is a perspective view, partly in cross section, of a nut used in the invention.
Figure 3:
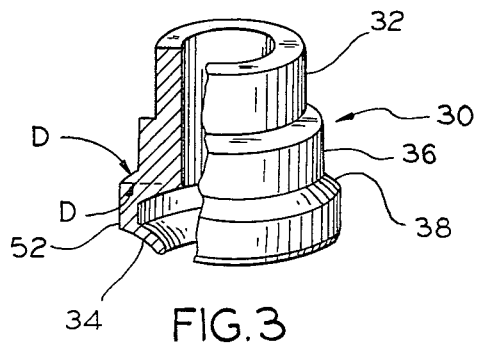
FIG. 3 is a perspective view of a flanged fitting part which cooperates with the nut of FIG. 1.
Figure 4:
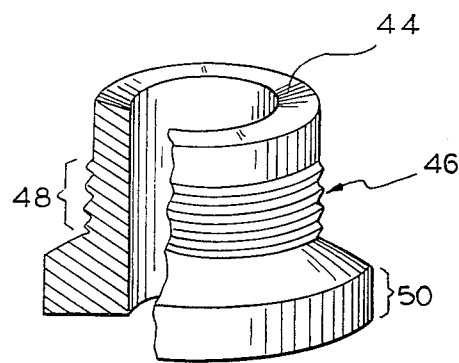
FIG. 4 is a threaded seat for the part shown in FIG. 3, which receives the nut of FIG. 1.

In FIG. 1, a nut 20 has a hexagonal external cross section to provide faces (e.g., 22) for receiving the jaws of a wrench. The bottom of the nut 20 has a threaded opening 24 for receiving the mating threaded part of FIG. 4. The top of the nut 20 has a smooth bore for receiving a sleeve on the flanged part of FIG. 3. The diameter of the bore 26 is less than the diameter of the threaded end 24. Therefore, a swivel shoulder is formed at 28, which is the junction between the threaded opening 24 and the bore 26.

Figure 2:
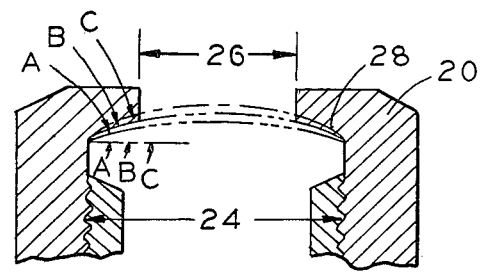
FIG. 2 is a schematic view of a cross section of the nut of FIG. 1, explaining its swivel shoulder design.

From FIG. 2 it is seen that the shoulder 28 may be formed with any convenient cross-sectional radius, which is best defined by the bearing angle formed at the outside edge of the shoulder 28. This is the angle between the shoulder and a line which is perpendicular to the axis of the nut. For example, the angle A—A may be 15°; the angle B—B may be 30°; and the angle C—C may be 45°. In one embodiment 15° is the preferred angle. (The radiused cross section is preferred; however, an angled shoulder may also be used. Therefore, the term "shoulder" is to be construed to include all equivalent structures.)

A second part 30 of the inventive seal includes a sleeve 32 terminating in an arched, annular flange 34 which is constructed in the manner taught in Christianson U.S. Pat. No. 3,672,704. The sleeve 32 may have a part 36 with a larger diameter which is substantially the same as the diameter of the bore 26. Therefore, when the nut 20 is slipped over the sleeve 36, the parts are fairly well aligned.

The bottom of the sleeve 36 terminates in a shoulder 38 which is cut at a cross-sectional radius that matches the radius of the shoulder 28 in the nut 20. (Again, the term "shoulder" should be construed broadly enough to cover all equivalent structures.) On the flanged-on part 30, the bearing angle of the shoulder 38 is the same as the bearing angle A—A to C—C of the cooperating shoulder 28 in the nut 20. Thus, if the 15° angle A—A is preferred for the shoulder 28 in the nut 20, the angle D—D of the shoulder 38 will also be 15°. Therefore, together these two parts tend to form a ball and socket swivel joint.

Below the shoulder 38, the fitting part 30 terminates in an annular flange 34 having the Belleville spring characteristics of the above-identified U.S. Pat. No. 3,672,704. The flange 34 rests upon a seat 44 (FIG. 4) on a third fitting part 46, in the form of a nipple which is threaded at 48.

For assembly, bore 26 in the nut 20 is fitted over the sleeve 36, and the Belleville spring sealing flange 34 is pressed against the seat 44 while the nut 20 is tightened on the threads 48. A hose, or any other suitable device, may be attached to the sleeve 32 of the flanged part 30 and also to the sleeve 50 of the nipple part 46, perhaps as shown in the Christianson patent. The object of the invention is to join these two hoses, or similar devices; however, that is irrelevant to an operation of this invention.

Figure 5:
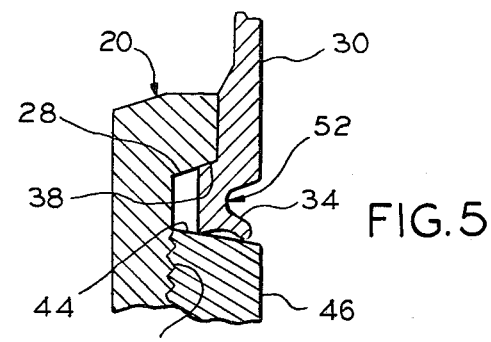
FIGS. 5-7 are cross-sectional views which illustrate how misalignment is tolerated by the inventive design.

Ideally, all parts are perfectly aligned axially when the nut 20 is tightened onto the nipple 46, as seen in FIG. 5. Therefore, the flange 34 is seated perfectly upon the seat 44. The two shoulders 28, 38 of the swivel joint seat perfectly in a metal-to-metal seal.

However, it is also possible that the parts will not be in perfect axial alignment. There could be a shifting of parts because they tend to spring back to a minimum energy position while the nut 20 is being tightened. Or parts could shift due to age or vibration or because manufacturing tolerances placed one part in an extreme right-hand position and another part in an extreme left-hand position. Of course there could also be many other reasons for misalignment of the fitting parts.

Figure 6:
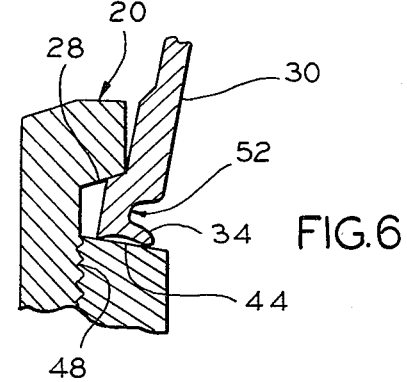
Figure 7:
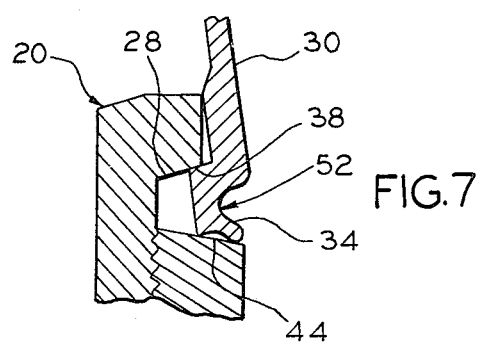

In FIG. 6, the misalignment is shown with the flange 34 shifted to the left, and in FIG. 7, it is shifted to the right. The shoulders 28, 38 function as a swivel joint so that there the metal-to-metal seal characteristics are the same in each of the three FIGS. 5-7. The tension in the Belleville spring formed by the arch 34 holds the two concentric sealing circles, at the toe and heel of the flange 34, in firm contact with the seat 44. The spring tension is substantially the same in each of the FIGS. 5-7. Therefore, the inventive fitting can tolerate a substantial misalignment.

Before the invention shown and described in U.S. Pat. No. 3,672,704, the fittings did not have an arch in the flange 34, but had a flat surface. When such a fitting is misaligned, the entire flange surface must lie flat, in face-to-face contact across the width of seat 44. This requirement for a broad face-to-face contact is much more likely to damage the neck area 52 which joins flange 34 to sleeve 36. Therefore, this type of fitting, with a flat flange, has tended to require the seat to be formed in the nut and the flange to formed on the nipple, which keeps the parts closer together to reduce the leverage that damages the neck 52. However, that close association makes a stiffer part and causes the flange to rub on the sealing surface during a tightening of the fitting.

From FIGS. 5-7, it is seen that the swivel socket at the shoulders 28, 38 enables the seal to remain more flexible and to avoid rubbing between the sealing surfaces, while the nut is being tightened.

Those who are skilled in the art will readily perceive how to modify the invention. Therefore, the appended claims should be construed to cover all equivalent structures falling within the true scope and spirit of the invention.

We claim:

1. A three-part flanged self-aligning seal comprising a first part in the form of a threaded nut with a shoulder forming a first half of a swivel joint, a second part in the form of a sleeve with an annular sealing flange which is arched in cross section, a shoulder being formed on said second part to form a second half of a swivel joint which cooperates with said shoulder in said nut to form a complete swivel joint, said shoulder being located a distance away from said arched flange, each of said shoulders forming a bearing angle which is in the approximate range of 15° to 45° with respect to a line perpendicular to the axis of said nut, a third part in the form of a threaded nipple fitting into said nut and capturing said second part therebetween, said nipple having a seat which is a flat surface tapering downwardly away from said shoulder for receiving and cooperating with said arched flange to form two concentric sealing rings pressed against said flat tapered surface when said nut is tightened over said nipple, and an axial fluid passageway extending through said three parts, gas pressure in said passageway pressing said annular sealing flange into a tighter gas sealing engagement with said tapered flat surface.

2. The flanged seal of claim 1 wherein the passageway through said nut has two different inside diameters thereby forming said shoulder where said two inside diameters abut, said sleeve having two different outside diameters thereby forming a shoulder where said outside diameters abut, said shoulders having complementary spherically arcuate surfaces for forming said swivel joint with said bearing angle.

3. The flanged seal of claim 2 wherein said sleeve and annular sealing flange are interconnected by a neck region, said flange being attached to one end of said neck and said arcuate surface being formed on the opposite end of said neck.

4. The flanged seal of claim 3 wherein any rubbing friction occurring when said nut is tightened on said nipple appears at said arcuate surfaces and not at said annular flange and said seat.

* * * * *